United States Patent
Kasazumi et al.

(10) Patent No.: US 10,488,655 B2
(45) Date of Patent: Nov. 26, 2019

(54) DISPLAY DEVICE

(71) Applicant: Panasonic Intellectual Property Management Co., Ltd., Osaka (JP)

(72) Inventors: Ken'ichi Kasazumi, Osaka (JP); Toshiya Mori, Osaka (JP); Hiroaki Okayama, Nara (JP); Satoshi Kuzuhara, Osaka (JP); Hiroyuki Furuya, Osaka (JP); Akira Kurozuka, Osaka (JP); Shinsuke Nakazono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/738,637

(22) PCT Filed: Jun. 1, 2016

(86) PCT No.: PCT/JP2016/002645
§ 371 (c)(1),
(2) Date: Dec. 21, 2017

(87) PCT Pub. No.: WO2017/002302
PCT Pub. Date: Jan. 5, 2017

(65) Prior Publication Data
US 2018/0157037 A1    Jun. 7, 2018

(30) Foreign Application Priority Data
Jun. 30, 2015  (JP) .................... 2015-132231

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 26/10* (2013.01);
(Continued)

(58) Field of Classification Search
CPC ........ B60K 2350/405; B60K 2350/921; B60K 2350/1084; G02B 27/01; G02B 27/0179;
(Continued)

(56) References Cited

U.S. PATENT DOCUMENTS 4,723,160 A * 2/1988 Connelly ........... G02B 27/0101
345/9
5,566,025 A * 10/1996 Knoll ................. G02B 27/0018
359/13
(Continued)

FOREIGN PATENT DOCUMENTS

EP     2827591 A2    1/2015
FR     2986873 A1    8/2013
(Continued)

OTHER PUBLICATIONS

International Search Report of PCT application No. PCT/JP2016/002645 dated Aug. 9, 2016.
(Continued)

*Primary Examiner* — Michael J Eurice
(74) *Attorney, Agent, or Firm* — Greenblum & Bernstein, P.L.C.

(57) ABSTRACT

A display device displays a virtual image of a first picture and a virtual image of a second picture by using a display medium. This display device includes a light source that emits light, a fixed screen, a movable screen, a driver, and a scanner. The fixed screen is fixedly disposed on an optical path between the light source and the display medium. The movable screen is also disposed on this optical path. The driver moves the movable screen along the optical path. The (Continued)

scanner scans the fixed screen and the movable screen with the light emitted from the light source, thereby forming the first picture on the fixed screen and the second picture on the movable screen.

10 Claims, 10 Drawing Sheets

(51) Int. Cl.
    *B60K 37/02*     (2006.01)
    *G09G 1/00*     (2006.01)
    *G09G 3/02*     (2006.01)
    *G02B 26/10*     (2006.01)
    *G06K 9/00*     (2006.01)
    *G02B 6/00*     (2006.01)

(52) U.S. Cl.
    CPC ......... *G06K 9/00671* (2013.01); *G09G 1/007* (2013.01); *G09G 3/025* (2013.01); *B60K 2370/1529* (2019.05); *B60R 2300/308* (2013.01); *G02B 26/101* (2013.01); *G02B 27/01* (2013.01); *G02B 2006/0098* (2013.01); *G02B 2027/014* (2013.01); *G02B 2027/0138* (2013.01); *G02B 2027/0154* (2013.01); *G02B 2027/0183* (2013.01); *G06F 2203/04803* (2013.01); *G09G 2310/0264* (2013.01)

(58) Field of Classification Search
    CPC ...... G02B 27/0093; G02B 2006/12104; G02B 2027/013; G02B 2027/0127; G02B 2027/0145; G02B 2027/0147; G02B 2027/0154; G02B 2027/0181; G02B 2027/0183; G02B 2027/0185; G09G 2380/10
    See application file for complete search history.

(56) References Cited

U.S. PATENT DOCUMENTS

| | | | |
|---|---|---|---|
| 8,766,879 B2* | 7/2014 | Fujikawa | G02B 27/0101 345/7 |
| 8,792,177 B2* | 7/2014 | Nakamura | G02B 27/0101 359/630 |
| 9,551,869 B2* | 1/2017 | Masuda | B60K 35/00 |
| 2005/0200962 A1* | 9/2005 | Voloschenko | G02B 5/0278 359/630 |
| 2007/0052703 A1* | 3/2007 | Seto | G06T 1/60 345/419 |
| 2007/0103747 A1* | 5/2007 | Powell | G02B 13/22 359/13 |
| 2008/0212194 A1* | 9/2008 | Powell | G02B 13/22 359/622 |
| 2009/0005961 A1* | 1/2009 | Grabowski | G01C 21/365 701/532 |
| 2009/0160736 A1 | 6/2009 | Shikita | |
| 2010/0315605 A1* | 12/2010 | Arita | G02B 26/0816 353/98 |
| 2011/0001639 A1* | 1/2011 | Sasaki | G02B 27/0101 340/995.19 |
| 2011/0134498 A1* | 6/2011 | Ohta | G02B 27/01 359/200.7 |
| 2012/0099170 A1* | 4/2012 | Shikii | G02B 27/01 359/3 |
| 2012/0123613 A1* | 5/2012 | Waki | G08G 1/167 701/1 |
| 2013/0021224 A1* | 1/2013 | Fujikawa | G02B 27/0101 345/7 |
| 2013/0038935 A1* | 2/2013 | Moussa | G02B 5/32 359/567 |
| 2013/0050834 A1* | 2/2013 | Fujikawa | G02B 27/0101 359/630 |
| 2013/0188259 A1* | 7/2013 | Nakamura | G02B 27/0101 359/630 |
| 2013/0188260 A1* | 7/2013 | Matsushita | B60K 35/00 359/632 |
| 2014/0036374 A1* | 2/2014 | Lescure | G02B 27/0101 359/630 |
| 2014/0091988 A1* | 4/2014 | Masuda | G02B 27/0149 345/7 |
| 2014/0320973 A1* | 10/2014 | Deubzer | G02B 27/0075 359/630 |
| 2015/0211877 A1* | 7/2015 | Laycock | G02B 3/14 701/444 |
| 2015/0212326 A1* | 7/2015 | Kress | G02B 27/0172 349/11 |
| 2015/0268468 A1* | 9/2015 | Masuda | B60K 35/00 345/589 |
| 2016/0004077 A1* | 1/2016 | Yanagisawa | B60K 35/00 359/633 |
| 2016/0086305 A1* | 3/2016 | Watanabe | B60K 35/00 345/672 |
| 2016/0124231 A1* | 5/2016 | Watanabe | G02B 27/0179 359/633 |
| 2016/0178901 A1* | 6/2016 | Ishikawa | B60K 35/00 345/7 |
| 2016/0178902 A1 | 6/2016 | Ando et al. | |
| 2016/0195727 A1* | 7/2016 | Kuzuhara | B60K 35/00 359/633 |
| 2016/0202479 A1* | 7/2016 | Okayama | B60K 35/00 359/633 |
| 2016/0202482 A1* | 7/2016 | Kuzuhara | G02B 27/01 359/633 |
| 2016/0377871 A1* | 12/2016 | Kress | G02B 27/0172 359/567 |
| 2017/0082855 A1* | 3/2017 | Christmas | G02B 27/2278 |
| 2017/0176744 A1* | 6/2017 | El-Ghoroury | G02B 27/0101 |
| 2017/0199383 A1* | 7/2017 | Machida | G02F 1/155 |
| 2018/0322845 A1* | 11/2018 | Machida | G02B 26/026 |

FOREIGN PATENT DOCUMENTS

| | | |
|---|---|---|
| JP | 2009-150947 | 7/2009 |
| JP | 2015-034945 A | 2/2015 |
| WO | 2014/208330 A1 | 12/2014 |
| WO | 2015/019567 A1 | 2/2015 |

OTHER PUBLICATIONS

The Extended European Search Report dated Feb. 23, 2018 for European Patent Application No. 16817414.2.
Communication pursuant to Article 94(3) EPC dated Feb. 6, 2019 for European Patent Application No. 16817414.2.
Communication pursuant to Article 94(3) EPC dated Aug. 1, 2019 for European Patent Application No. 16817414.2.

* cited by examiner

DISPLAY DEVICE

This application is a U.S. national stage application of the PCT International Application No. PCT/JP2016/002645 filed on Jun. 1, 2016, which claims the benefit of foreign priority of Japanese patent application No. 2015-132231 filed on Jun. 30, 2015, the contents all of which are incorporated herein by reference.

TECHNICAL FIELD

The present invention relates to display devices.

BACKGROUND ART

Head-up displays (also abbreviated below as HUDs) are known vehicular display devices. A HUD displays information regarding a vehicle state and a route by using images of figures containing numbers, characters, and arrows, for example.

For example, some vehicular HUDs form virtual images in front of a windshield as the above images, thereby providing these virtual images for a driver (refer to PTL 1). The HUD described in PTL 1 is an application example of a technique in which a screen scanned to form an image moves along an optical axis whereby a projected location of a virtual image varies. Herein, the projected location of a virtual image refers to a location of a virtual image in a depth direction as viewed by a driver and will also be referred to below as a display distance. By changing the projected location in this manner, the display distance can be varied with a running speed of the vehicle. This can prevent the driver from greatly moving his/her point of view during driving.

CITATION LIST

Patent Literature

PTL 1: Unexamined Japanese Patent Publication No. 2009-150947

SUMMARY OF THE INVENTION

The present invention provides a display device that displays an image that a user can view easily.

A display device according to an aspect of the present invention displays a virtual image of a first picture and a virtual image of a second picture by using a display medium. This display device includes a light source that emits light, a fixed screen, a movable screen, a driver, and a scanner. The fixed screen is fixedly disposed on an optical path between the light source and the display medium. The movable screen is also disposed on this optical path. The driver moves the movable screen along the optical path. The scanner scans the fixed screen and the movable screen with the light emitted from the light source, thereby forming the first picture on the fixed screen and the second picture on the movable screen.

It should be noted that those comprehensive or specific aspects may be implemented by a system, a method, an integrated circuit, a computer program, or a computer-readable recording medium such as a CD-ROM, or may be implemented by any combination of the system, the method, the integrated circuit, the computer program, and the recording medium.

DESCRIPTION OF EMBODIMENT

Prior to describing an exemplary embodiment of the present invention, a problem associated with conventional display devices will be described briefly. In the display device in PTL 1, a plurality of screens that display virtual images through a windshield are disposed side by side, and locations of plurality of screens on an optical axis are varied. With this configuration, a plurality of virtual images with different display distances can be displayed at the same time. Further, all of the screens are movable along the optical axis. By moving the screens along the optical axis, the display distances of the virtual images can be changed with time. As a result, the display device can display virtual images indicating the vehicle and objects around the vehicle, such as an intersection at which the vehicle will turn, other vehicles, and obstacles, with their display distances varied in accordance with the running of the vehicle.

However, since all the screens are movable, the display distances of all the virtual images may be varied. In the display device in PTL 1, thus, whenever a user focuses his/her eye on an image indicating information to be checked, the display distance of this image may be varied. In short, the display device in PTL 1 may provide an image that the user views in order to obtain information, with its display distance continuously varied. In which case, it takes a long time for the user to focus the eye on the image. As a result, the user may need a long time to check information and may fail to view other information during that time.

An exemplary embodiment of the present disclosure will be specifically described below with reference to the accompanying drawings. It should be noted that the exemplary embodiment that will be described below provides comprehensive, specific examples of the present disclosure. Numerical values, shapes, materials, constituent elements, arrangement positions and connection modes of the constituent elements, steps, and order of the steps, for example, illustrated in the following exemplary embodiment are examples, and therefore are not intended to limit the present invention. Furthermore, among constituent elements in the following exemplary embodiment, constituent elements not recited in the independent claim indicating the broadest concept are described as optional constituent elements.

Figure 1:
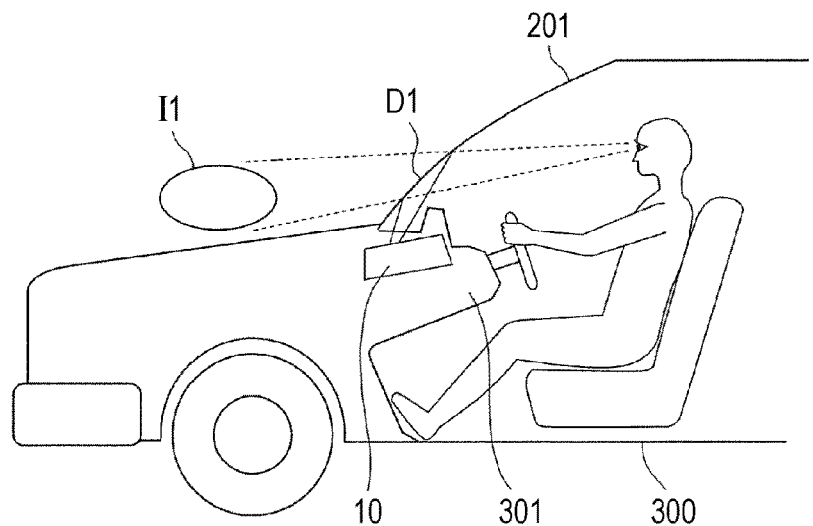
FIG. 1 is a view of a usage example of a display device according to an exemplary embodiment.

FIG. 1 is a view of a usage example of display device 10 according to this exemplary embodiment. Display device 10 is implemented by a vehicular head-up display (HUD) and is mounted on an upper surface of dashboard 301 in vehicle 300 or other adjacent surface.

Display device 10 irradiates region D1 on windshield 201 with light. This windshield 201 serves as a display medium. Then, the irradiated light is reflected by windshield 201. This reflected light is directed to the eye of a driver sitting on a driver's seat, who is a user of display device 10. When the reflected light is incident on the driver's eye, the driver recognizes this light as virtual image I1 in front of actual objects that can be viewed through windshield 201. This virtual image I1 seems to be present on the opposite side of windshield 201, outside vehicle. In this exemplary embodiment, this series of processes will be expressed below as "display device 10 displays virtual image I1 by using windshield 201".

Figure 2:
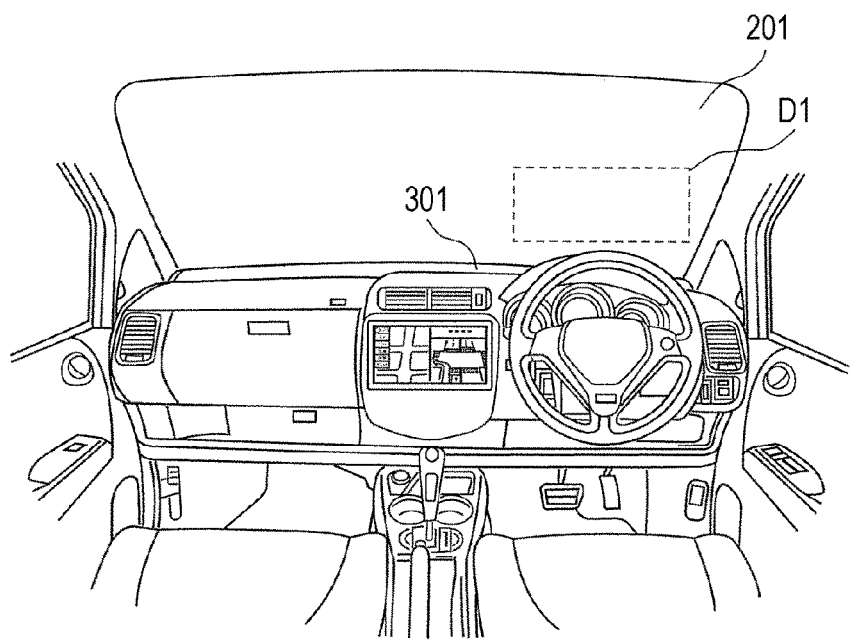
FIG. 2 is a view of an example of an area in which the display device according to the exemplary embodiment displays an image.

FIG. 2 is a view of an example of region D1 irradiated with light by display device 10.

Display device 10 mounted on dashboard 301 irradiates region D1 on windshield 201 with light. For example, region D1, which is surrounded by a broken line in FIG. 2, may be positioned in a lower portion of windshield 201 and near the driver's seat. As a result of the irradiation, virtual image I1 is displayed so as to seem to be present on the opposite side of windshield 201 from a point of view of the driver sitting on the driver's seat, namely, outside vehicle. In this case, when the light is incident on region D1 at a lower location, the driver can view virtual image I1 at a nearer site in a depth direction within a three-dimensional image space. When the light is incident on region D1 at a higher location, the driver can view virtual image I1 at a further site.

Figure 3:
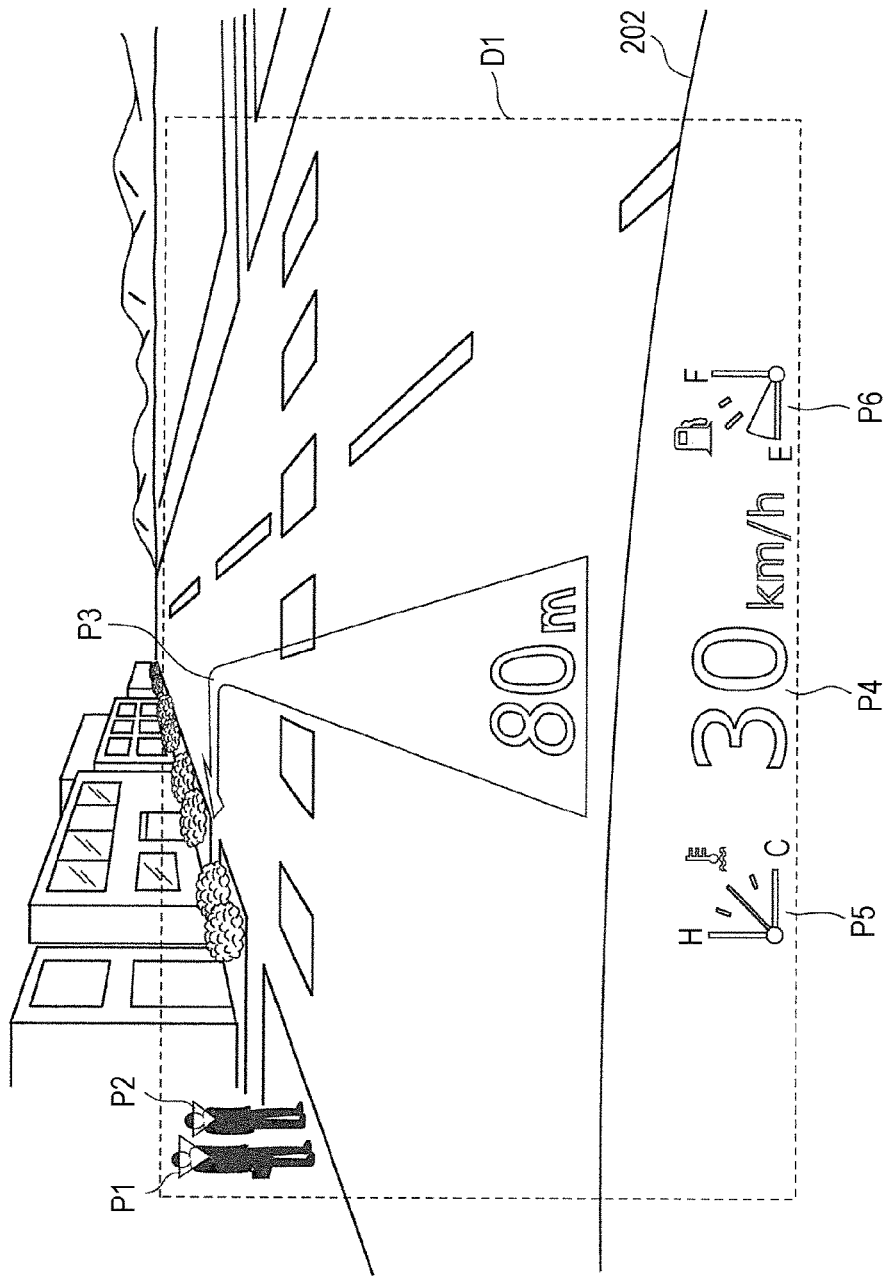
FIG. 3 is a view of an example of an image displayed by the display device according to the exemplary embodiment and an example of an overlap between a front scene and the image which a driver can view in a running vehicle.

FIG. 3 is a view of an example of an image displayed by display device 10 and an example of an overlap between a front scene and the image which the driver can view in running vehicle 300.

The entire image in FIG. 3 is a portion of a scene within a driver's viewing field when a driver (not illustrated) drives vehicle 300. In FIG. 3, pictures P1 to P6 are specific examples of virtual images I1 displayed by display device 10. The remaining pictures correspond to objects positioned in front of vehicle 300 or windshield 201 which the driver can view. Pictures P1 to P3 are displayed so as to seem to overlap objects positioned far from hood 202 of vehicle 300. Pictures P4 to P6 are displayed so as to seem to overlap hood 202. Details of this will be described below.

Each of pictures P1 and P2 indicates a location of a pedestrian on the diagonally forward left of vehicle 300. This can be realized in the following manner, for example. Vehicle 300 includes an unillustrated human body detector. This human body detector obtains information regarding a location of a human present within a predetermined area around vehicle 300. Vehicle 300 further includes an unillustrated eye location detector that obtains a location of driver's eye. This eye location detector obtains information regarding the location of the driver's eye. Based on the information regarding the locations of humans and driver's eye obtained in this manner, display device 10 calculates locations of points overlapping the pedestrians within the three-dimensional image space in which virtual image I1 is displayed from the driver's point of view. Then, display device 10 displays pictures P1 and P2 at the calculated locations.

Picture P3 indicates a point positioned 80 meters ahead of vehicle 300, at which vehicle 300 will turn left. This can be realized in the following manner, for example. Vehicle 300 includes an unillustrated car navigation system. This car navigation system obtains a route to a destination and determines guidance information to be displayed. In addition, display device 10 obtains the driver's eye location information in a manner similar to the above. Based on the guidance information determined and the driver's eye location information obtained in the above manner, display device 10 calculates a location of a point overlapping the left-turn point from the driver's point of view in the three-dimensional image space in which virtual image I1 is displayed. Then, display device 10 displays picture P3 at the determined location. Picture P3 is displayed so as to be visually perceived by the driver as a single picture whose depth spreads out from the front to the depth in the driver's view, namely, whose display distance continuously and spatially varies.

Pictures P4 to P6 indicate a running speed of vehicle 300, a temperature of cooling water, and an amount of remaining fuel in vehicle 300, respectively. This can be realized in the following manner, for example. Vehicle 300 includes various types of unillustrated sensors that obtain information regarding a running speed, a temperature of cooling water, and an amount of remaining fuel. Display device 10 displays the various information obtained in this manner at a predetermined location, more specifically in a lower front portion of the three-dimensional image space in which virtual image I1 is displayed in the driver's view. As a result, pictures P4 to P6 are displayed so as to overlap hood 202 in the driver's view.

The locations of the pedestrians relative to the driver's eye which are indicated by pictures P1 and P2 change with moving of the pedestrians or the running of vehicle 300. Moreover, a distance between the left-turn point indicated by picture P3 and the driver's eye decreases with the running of vehicle 300. In terms of improved driving convenience and security, it is necessary to change display locations of pictures P1 to P3 and display distances (depth perception) of pictures P1 to P3 with time when vehicle 300 runs, for example.

Appearances, such as numbers, shapes or orientations of figures, or colors, of pictures P4 to P6 change, but their display locations and display distances do not need to change. Rather, the display distances and locations are preferably fixed in terms of improved driving convenience and security. A reason is that the driver can visually perceive pictures in a continuous and prompt manner if their display distances and display locations are fixed.

As described above, however, conventional techniques may fail to display both a virtual image in a portion of a display region with its display distance continuously fixed and a virtual image in another portion of the display region with its display distance continuously and spatially varied with time. Display device 10 according to this exemplary embodiment can achieve this technique with a configuration that will be described below.

Figure 4:
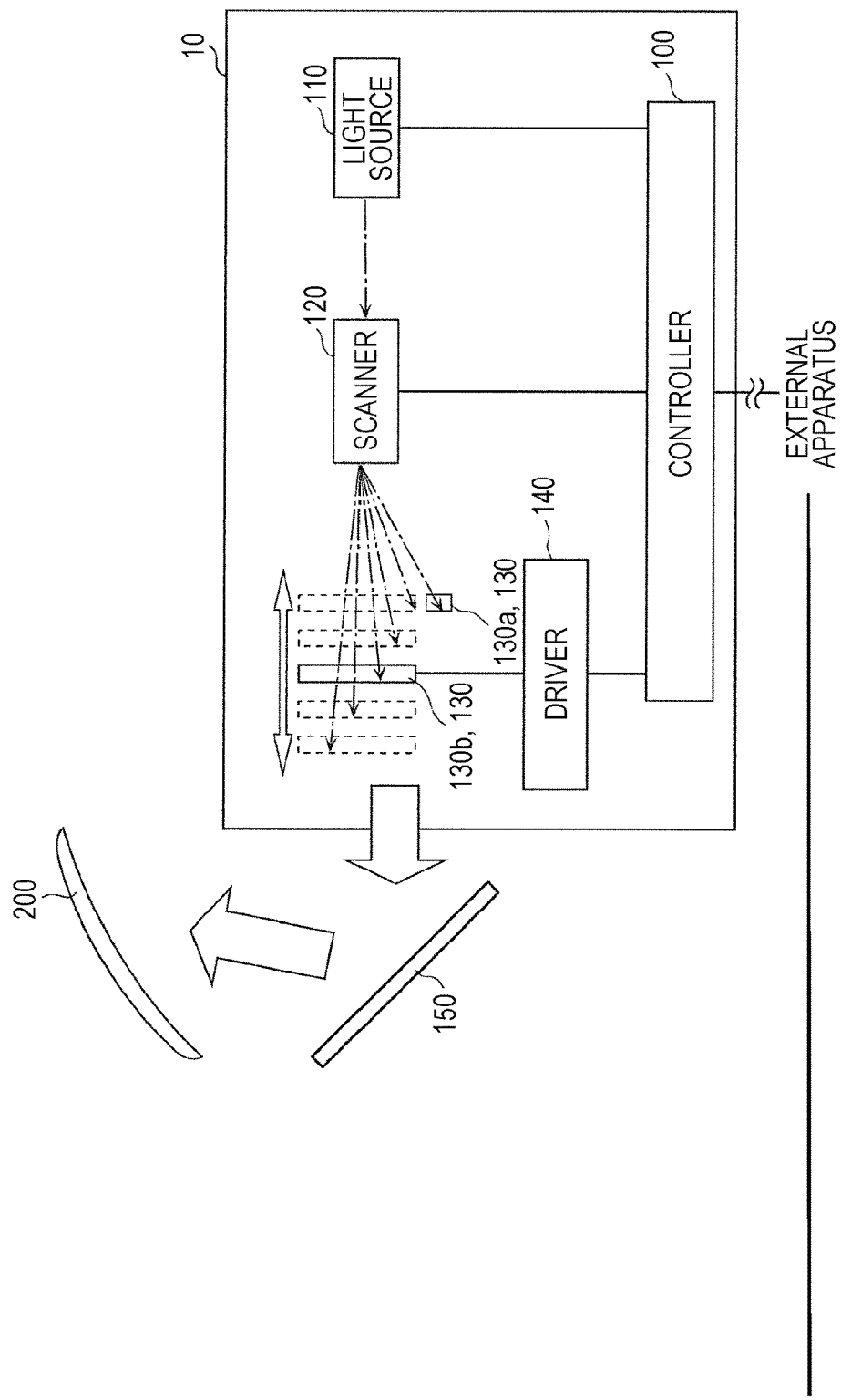
FIG. 4 is a block diagram illustrating a functional configuration of the display device according to the exemplary embodiment.

FIG. 4 is a block diagram illustrating a functional configuration of display device 10. Display device 10 includes light source 110, scanner 120, fixed screen 130a, movable screen 130b, driver 140, and controller 100.

Light source 110 emits light that indicates a virtual image to be displayed by display device 10. For example, light source 110 may be implemented by a pico-projector that includes semiconductor lasers that emit red (R), green (G), and blue (B) light as light sources. Such a pico-projector can display a highly visible virtual image, independently of colors of objects and vehicle bodies around vehicle 300 and surrounding brightness. Using the laser light source enables the emitted light to be focused on an irradiated surface, independently of a distance and angle between the laser light source and the irradiated surface. Furthermore, using a pico-projector enables a space above dashboard 301 which is occupied by display device 10 to be minimized due to its compact body. It should be noted that in FIG. 4, arrows of alternate long and short dash lines which start from light source 110 indicate an optical path in display device 10.

Scanner 120 is disposed on the optical path of the light emitted from light source 110 and performs scanning with this emitted light. Targets to be scanned are fixed screen 130a and movable screen 130b, which will also be collectively referred to below as a screen 130. Scanner 120 may be implemented with a micro electro mechanical systems (MEMS) mirror, for example. Screen 130 may be implemented by a diffusing screen, for example. Scanner 120 scans screen 130 with the light emitted from light source 110, thereby forming, on screen 130, pictures to be displayed as virtual images. Details of a configuration of screen 130 will be exemplified later.

Fixed screen 130a is fixedly disposed on the optical path. Movable screen 130b is also disposed on the optical path but can reciprocate (vibrate) in parallel with and along the optical path, as indicated by a double-headed arrow in the figure. Details of this movement will be described later. The words "optical path" discussed herein refers to an optical path along which light travels from light source 110 to optical system 150. The above method in which scanner 120 scans screen 130 may be two-dimensional scanning, such as raster scanning. Details of this will be described later.

Driver 140 may be implemented by an actuator, for example. Driver 140 causes movable screen 130b to reciprocate (vibrate), as indicated by the double-headed arrow, in accordance with a signal from controller 100 that will be described below.

Controller 100 obtains information from external apparatuses, for example, a car navigation system, a speed meter, a water temperature meter, a human body detector, an eye location detector, and an obstacle detector, which are installed in a vehicle. Based on this information, controller 100 calculates a picture to be displayed as a virtual image and its location. Then, controller 100 outputs information indicating the calculated result to light source 110 as a signal, thereby controlling the light emission of light source 110. In addition, controller 100 outputs control signals to scanner 120 and driver 140, thereby controlling operations of scanner 120 and movable screen 130b. These operations may be performed independently but may include adjustments, such as synchronization, of individual sections. Controller 100 configured above may be implemented by a central processing unit (CPU) or a processor, for example, and performs the above processes by reading computer programs from a recording medium, such as a memory, and executing this program. In this example, any device of the external apparatuses may also be included in constituent elements of display device 10.

The pictures formed on screen 130 in display device 10 configured above are projected onto display medium 200 through optical system 150, as indicated by two block arrows on the left of the figure.

In this exemplary embodiment, display medium 200 may correspond to windshield 201 in vehicle 300. Optical system 150 may include an optical element, such as a lens or a mirror, or a combination of such optical elements. For example, the optical path extending from screen 130 may be curved toward display medium 200 by the mirror, so that a picture formed on screen 130 is projected onto display medium 200. Like windshield 201 of the vehicle in this exemplary embodiment, a region (region D1 in this embodiment) on which a picture formed on display medium 200 is projected may also have a curved surface. In this case, a curved mirror may be used as the above mirror in order to adjust deformation of a picture projected onto this region. For example, a picture formed on screen 130 may be magnified or subjected to an orientation adjustment by the lens and then projected onto display medium 200. The orientation adjustment refers to, for example either a process in which a positional relationship of an up/down orientation between pictures on screen 130 is reflected, without any modifications, in a region on which the pictures on display medium 200 are projected, or a process in which the positional relationship is reflected with the up/down orientation reversed. This exemplary embodiment will be described on the premise that the positional relationship of the up/down orientation between pictures on screen 130 is reflected in region D1 on windshield 201 without any modifications, unless otherwise specified. In this case, entire optical system 150 or a portion of optical system 150 may be included in constituent elements of display device 10.

With the configuration described above, display device 10 displays a virtual image as in the aspect illustrated in FIG. 3. Next, a description will be given of a method of displaying a virtual image with its display distance varied.

Only a picture formed on movable screen 130b of screen 130 is displayed as a virtual image with a variable display distance. This picture is also referred to below as a second picture, whereas a picture formed on fixed screen 130a is also referred to below as a first picture. As described above, movable screen 130b is movable along the optical path. In other words, a distance on the optical path between movable screen 130b and display medium 200 is variable. When the distance on the optical path between movable screen 130b and display medium 200 decreases, the display distance of the virtual image also decreases. In this case, the driver can view the virtual image at a short distance. When the distance on the optical path between movable screen 130b and display medium 200 increases, the display distance of the virtual image also increases. In this case, the driver can view the virtual image at a long distance. This may also apply to conventional techniques. For example, if scanner 120 scans moving movable screen 130b to form a picture on movable screen 130b, the display distance of this picture varies during this operation. For example, when movable screen 130b is positioned on the optical path at the longest distance from display medium 200, scanner 120 starts scanning movable screen 130b laterally from its uppermost portion and then decreases the scanned line as movable screen 130b moves toward display medium 200. The picture formed in this manner is projected onto D1, and this projected picture is visually perceived by the driver as a virtual image whose display distance increases from the bottom to the top.

In the above display method, further, driver 140 causes to reciprocate (vibrate) at a high speed. For example, movable screen 130b is caused to vibrate at a frequency of 60 Hz along the optical path. Accompanied by this, scanner 120 also performs the scanning at a high speed. For example, scanner 120 may scan movable screen 130b from the top while movable screen 130b is moving along a route (first route) from the furthest site of display medium 200 toward display medium 200. Likewise, scanner 120 may scan movable screen 130b from the bottom while movable screen 130b is moving along a route (second route) from the nearest site of display medium 200 to the furthest site of display medium 200. If images formed on the screen by the one-way scanning are regarded as one frame, display device 10 can display a virtual image with its display distance varied by using video of 120 frames per second (fps).

A description will be given of an example of using the above method to display pictures in this exemplary embodiment. For example, when picture P3 illustrated in FIG. 3 is projected onto and formed on movable screen 130b by optical system 150, scanner 120 scans movable screen 130b downward during the movement of movable screen 130b along the first route and upward during the movement along the second route. Picture P3 displayed in this manner is recognized by the driver as a virtual image of an arrow whose lower end is nearer the driver but whose upper end is further from the driver's point of view. In other words, picture P3 is recognized as a virtual image with its display distance continuously varying in the space. Furthermore, by adjusting a timing of forming a picture in relation to the location of movable screen 130b, display device 10 can display a virtual image with its display distance varied with time as vehicle 300 moves toward the left-turn point indicated by the arrow. Pictures P1 and P2 are projected onto and formed on movable screen 130b by optical system 150 when pictures P1 and P2 are present at locations corresponding to display distances at which the driver can view pictures P1 and P2 overlapping pedestrians during the movement of movable screen 130b along the first route, the second route, or both the first and second routes.

The vibration speed of movable screen 130b is not limited to 60 Hz. The vibration speed only has to be high enough to update frames upon scanning according to the vibration without causing human eye to recognize flicker between intervals. For example, a moving image may be updated at a speed of 60 fps, in which case this moving image is recognized as being smooth by a user. The vibration speed does not necessarily have to be constant. For example, the vibration speed may temporarily decrease in the course of the movement. A virtual image based on a picture formed at this decreased speed is visually perceived by the driver as an image having a smaller depth than a depth of a virtual image based on a picture formed on movable screen 130b moving at a normal speed. Furthermore, the movable screen 130b may temporarily or intermittently stop. In this case, a virtual image that is visually perceived as a picture present in an upright position by the driver is formed. For example, pictures P1 and P2 that do not provide depth perception may be displayed as such virtual images.

Next, fixed screen 130a will be described in comparison with movable screen 130b.

As described above, fixed screen 130a is fixedly disposed on the optical path between light source 110 and display medium 200. More specifically, fixed screen 130a is fixedly disposed on the optical path between scanner 120 and optical system 150. The words "fixedly disposed" mean that a distance along the optical path between fixed screen 130a and display medium 200 is not variable as opposed to movable screen 130b. A picture (first picture) formed on fixed screen 130a is projected onto display medium 200 and displayed as a virtual image with its display distance fixed. If a positional relationship on the optical path between fixed screen 130a and movable screen 130b conforms to the relationship illustrated in FIG. 4, the fixed display distance of a virtual image based on a picture formed on fixed screen 130a approximates to the longest one of variable display distances of a virtual image based on a picture formed on movable screen 130b. This positional relationship is an example used for the explanation, and the positional relationship between fixed screen 130a and movable screen 130b in display device 10 according to this exemplary embodiment is not limited to this positional relationship. The arrangement of the individual constituent elements in FIG. 4 does not have to be an actual arrangement.

Figure 5:
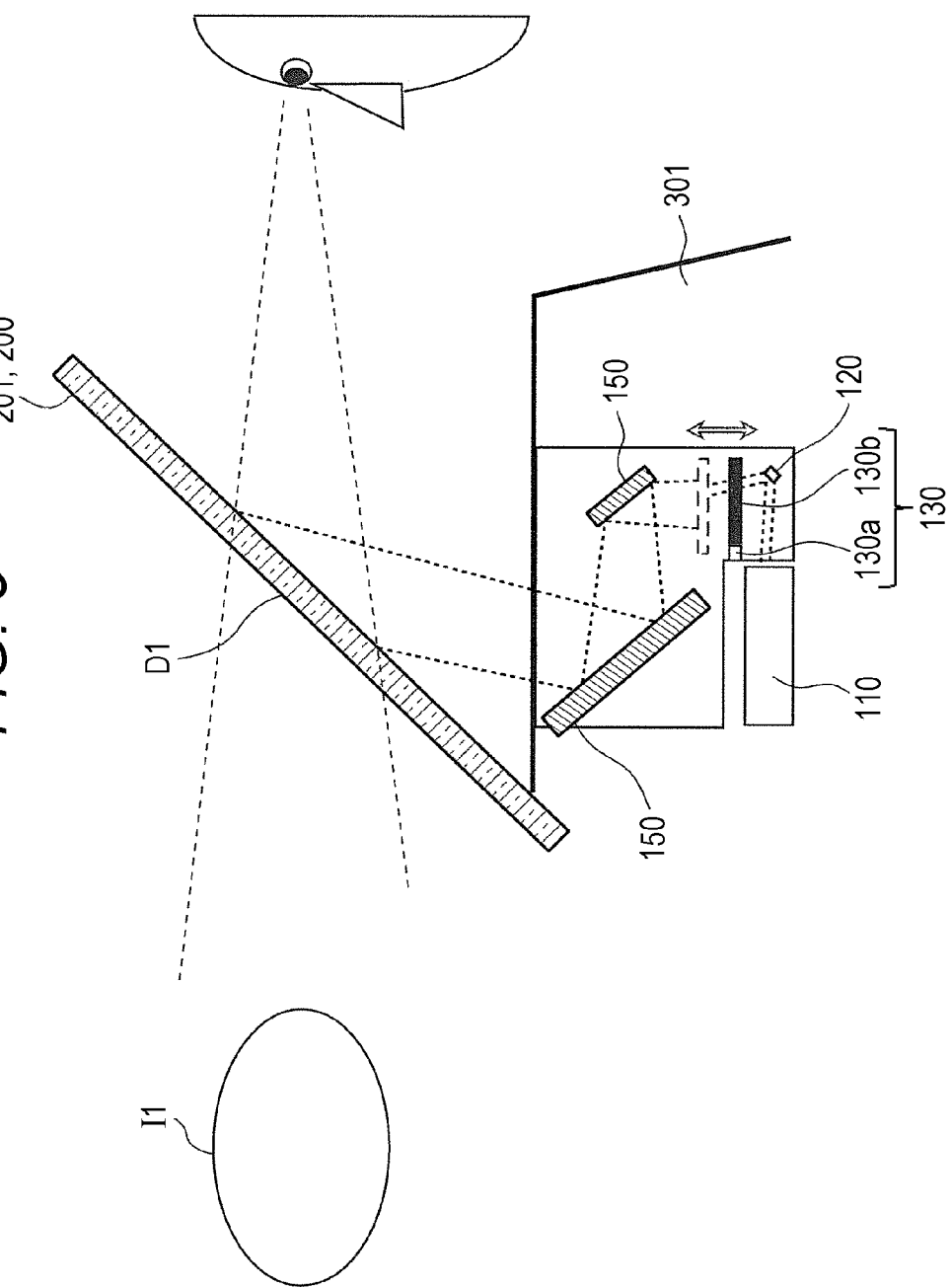
FIG. 5 is a view of an example of an internal configuration of the display device according to the exemplary embodiment.

Next, a description will be given in more detail of an internal configuration of display device 10 according to this exemplary embodiment. FIG. 5 is a schematic view of an example of an internal configuration of display device 10 according to this exemplary embodiment. It should be noted that the reference characters are commonly assigned to in FIGS. 1 to 5.

In the example illustrated in FIG. 5, display device 10 is disposed inside dashboard 301.

Two broken lines that extend from light source 110, pass through scanner 120, screen 130, and optical system 150, and reach display medium 200 (windshield 201) indicate an optical path.

As illustrated in FIG. 5, first, light emitted from light source 110 is reflected by scanner 120.

Then, scanner 120 reflects the emitted light while changing its orientation, thereby scanning screen 130. In FIG. 5, the light is incident on only movable screen 130b of screen 130. In this exemplary embodiment, however, scanner 120 sets both fixed screen 130a and movable screen 130b as a single target to be scanned and performs the scanning.

Movable screen 130b reciprocates along the optical path, as indicated by a double-headed arrow in FIG. 5. A location of fixed screen 130a is fixed on the optical path between scanner 120 and optical system 150.

Light on the optical path illustrated in FIG. 5 passes through screen 130 and reaches optical system 150; however, the configuration of display device 10 according to this exemplary embodiment is not limited to this configuration. As an alternative example, light on the optical path is reflected by screen 130 and reaches optical system 150.

The operations, described above, of light source 110 and scanner 120 are controlled by controller 100 that is not illustrated in FIG. 5. The operation of movable screen 130b is also controlled by controller 100 through driver 140 that is not illustrated in FIG. 5.

Optical system 150 projects a picture formed on screen 130 onto region D1 on windshield 201. Optical system 150 includes two mirrors in the example illustrated in FIG. 5; however, a configuration of optical system 150 according to this exemplary embodiment is not limited to this configuration. Alternatively, optical system 150 may further include a lens and other mirrors.

The driver visually perceives the picture projected onto D1 as a virtual image I1 on the opposite side of windshield 201, outside the vehicle.

If display device 10 is used as a vehicular HUD as in this exemplary embodiment, external light, such as sunlight, may travel along the above optical path in the opposite direction. In this case, the external light may enter the vehicle 300 through windshield 201, then be curved by optical system 150, and reach screen 130. The entry of the external light in this manner may shine on entire screen 130 and thus decrease a brightness difference of light on screen 130, thereby lowering a contrast of a virtual image. If the external light is sunlight, infrared rays may increase inner temperature of display device 10, and ultraviolet rays may degrade parts of screen 130 and other constituent elements. To avoid an occurrence of such problems, for example, at least a portion of optical system 150 may be coated so that only light in a specific wavelength passes through entire optical system 150. In addition to optical system 150 configured above, a laser light source that emits light in a narrow wavelength spectrum may be used as light source 110. This configuration can efficiently pass ultraviolet light, infrared light, yellow light, and other light that are not required to display a virtual image.

Figure 6:
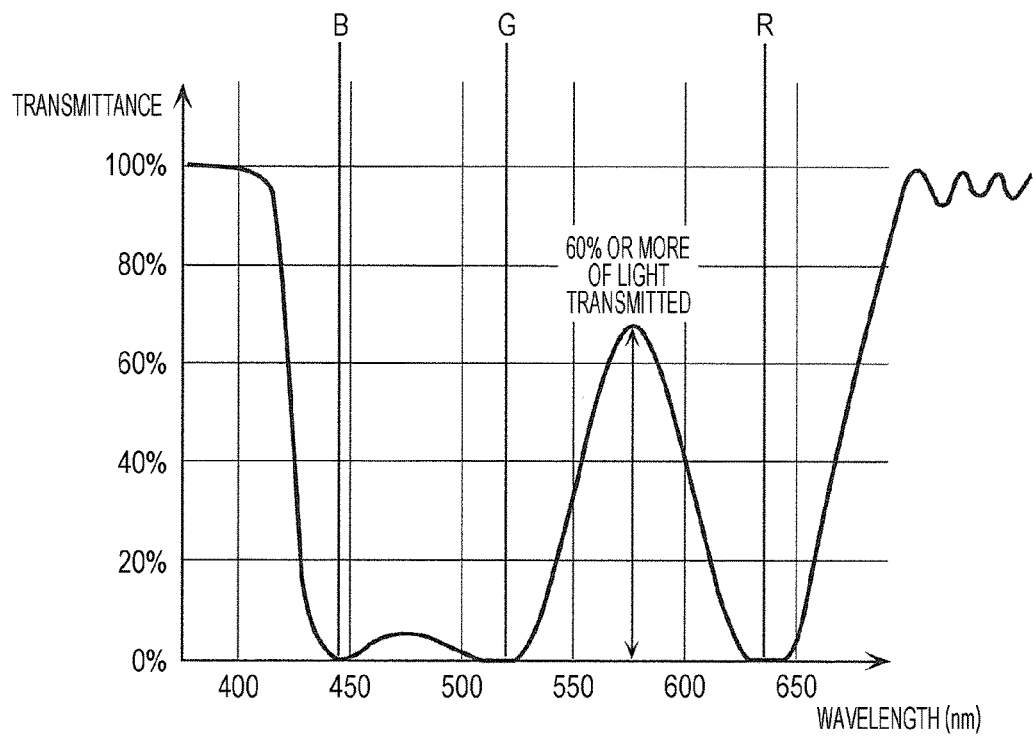
FIG. 6 is a diagram of an example of light transmission characteristics of an optical system according to the exemplary embodiment.

FIG. 6 is a diagram of an example of light transmission characteristics of a mirror in optical system 150 according to this exemplary embodiment which can avoid an occurrence of the above problems. As can be seen from FIG. 6, the mirror in optical system 150 passes almost all ultraviolet light (410 nm or shorter) and infrared light (700 nm or longer). Thus, optical system 150 stops light of these types from reaching screen 130. This configuration can reduce the risk of external light causing a temperature rise and degradation of parts as described above. However, the mirror reflects almost all light in a visible band with a wavelength other than a wavelength of part of light. More specifically, the mirror reflects about 100% of light with approximately wavelengths of three primary colors (R, G, and B in the figure) which is emitted from light source 110. Thus, when light source 110 emits light in order to display a virtual image and this light reaches a light emission surface of screen 130, almost all of the light travels along the optical path and reaches windshield 201. Using optical system 150 provided with the mirror exhibiting this light transmission characteristics can suppress lowering of a contrast of a virtual image due to external light even when display device 10 is used as a vehicular HUD. The reason why the mirror transmits up to 60% or more of yellow light and light in an adjacent wavelength spectrum (550 nm to 600 nm) as illustrated in FIG. 5 is to minimize lowering of a contrast of a virtual image by attenuating light that is not required to display the virtual image and that may decrease a brightness difference of light on screen 130.

In a specific example to be carried out, at least one of the mirrors illustrated in FIG. 5 may be coated so as to exhibit the above characteristic.

If optical system 150 includes a plurality of mirrors, the functions may be distributed among the plurality of mirrors. For example, a first mirror may pass infrared light and ultraviolet light, and a second mirror may pass unwanted visible light that is not required to display a virtual image. After having passed through the mirrors, unwanted light is converted into heat in an unillustrated mirror holder, for example. If the functions are distributed among the plurality of mirrors as described above, the heat is absorbed separately at a plurality of sites. Therefore, this configuration is more effective in suppressing a temperature rise at each site than a configuration in which heat is absorbed at only one site.

In the above case, the first mirror preferably has a larger area than the area of the second mirror. Mirrors that pass visible light are manufactured by using a dielectric multi-layer film, for example, and thus may involve a high manufacturing cost. Therefore, by using the second mirror that has a smaller area than the area of the first mirror, the manufacturing cost can be decreased. Moreover, mirrors that pass infrared light and ultraviolet light absorb a large amount of heat. By passing infrared and ultraviolet light through a mirror with a large area, the temperature rise can be suppressed effectively.

Next, a configuration of screen 130 will be described in detail through some examples.

Figure 7:
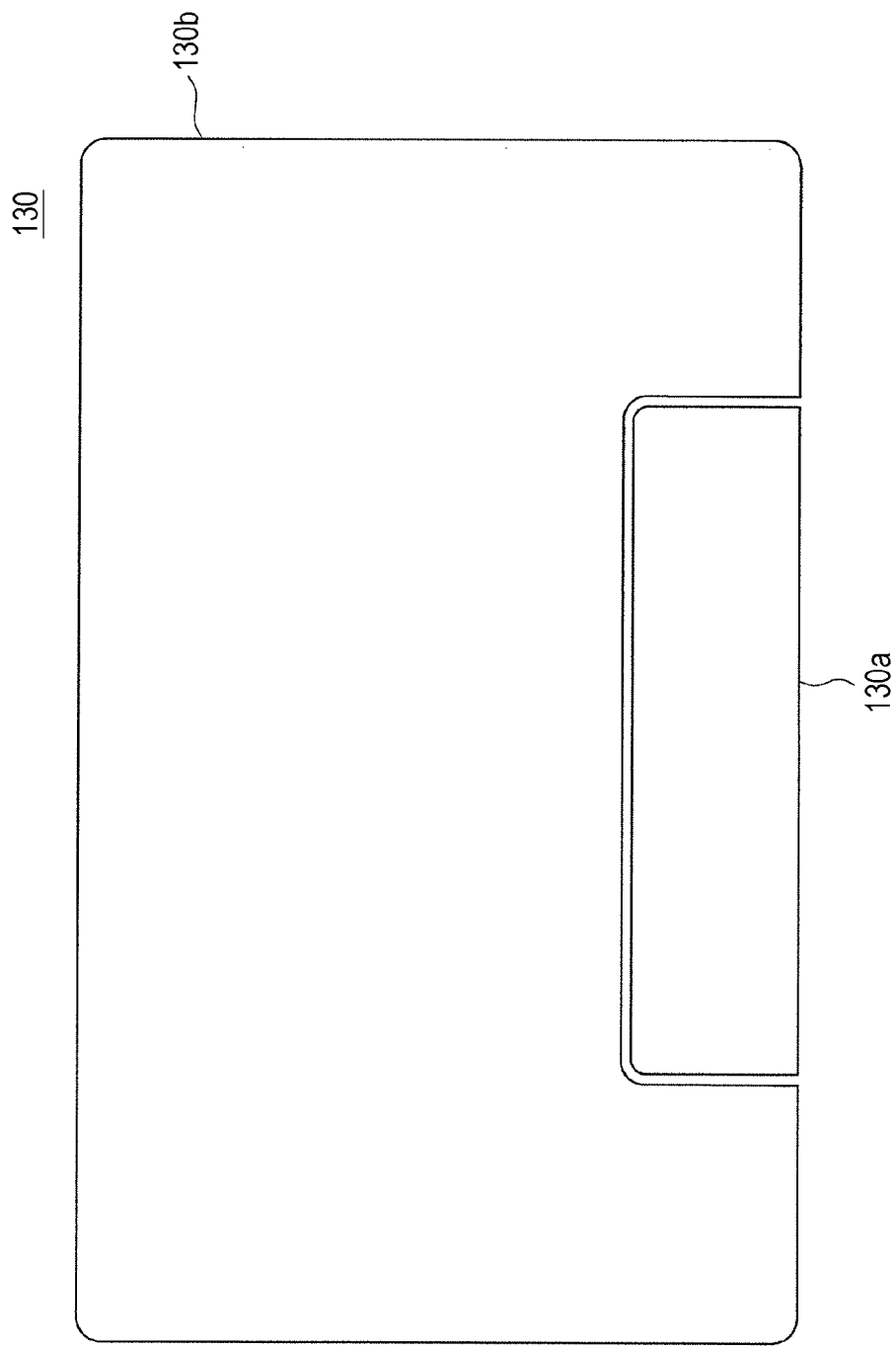
FIG. 7 is a schematic view of an example of a configuration of a screen according to the exemplary embodiment.

FIG. 7 is a view of an example of a configuration of screen 130 according to this exemplary embodiment. FIG. 7 schematically illustrates screen 130 as viewed from the location of scanner 120 along the optical path. In the example illustrated in FIG. 7, movable screen 130*b* has a cut on its lower end on this page. Fixed screen 130*a* occupies an interior of this cut. Fixed screen 130*a* and movable screen 130*b* are disposed so as to be seemingly integrated with each other. In this example, if regarded as an integrated part, fixed screen 130*a* and movable screen 130*b* form a substantially rectangular shape. Since fixed screen 130*a* is positioned on the lower end of the substantially rectangular shape on this page, a contour of fixed screen 130*a* contains a portion of the lower side of the substantially rectangular shape as its portion.

Fixed screen 130*a* and movable screen 130*b*, configured above, in screen 130 correspond to respective sub-regions within region D1 on windshield 201 on which pictures are to be projected.

Figure 8:
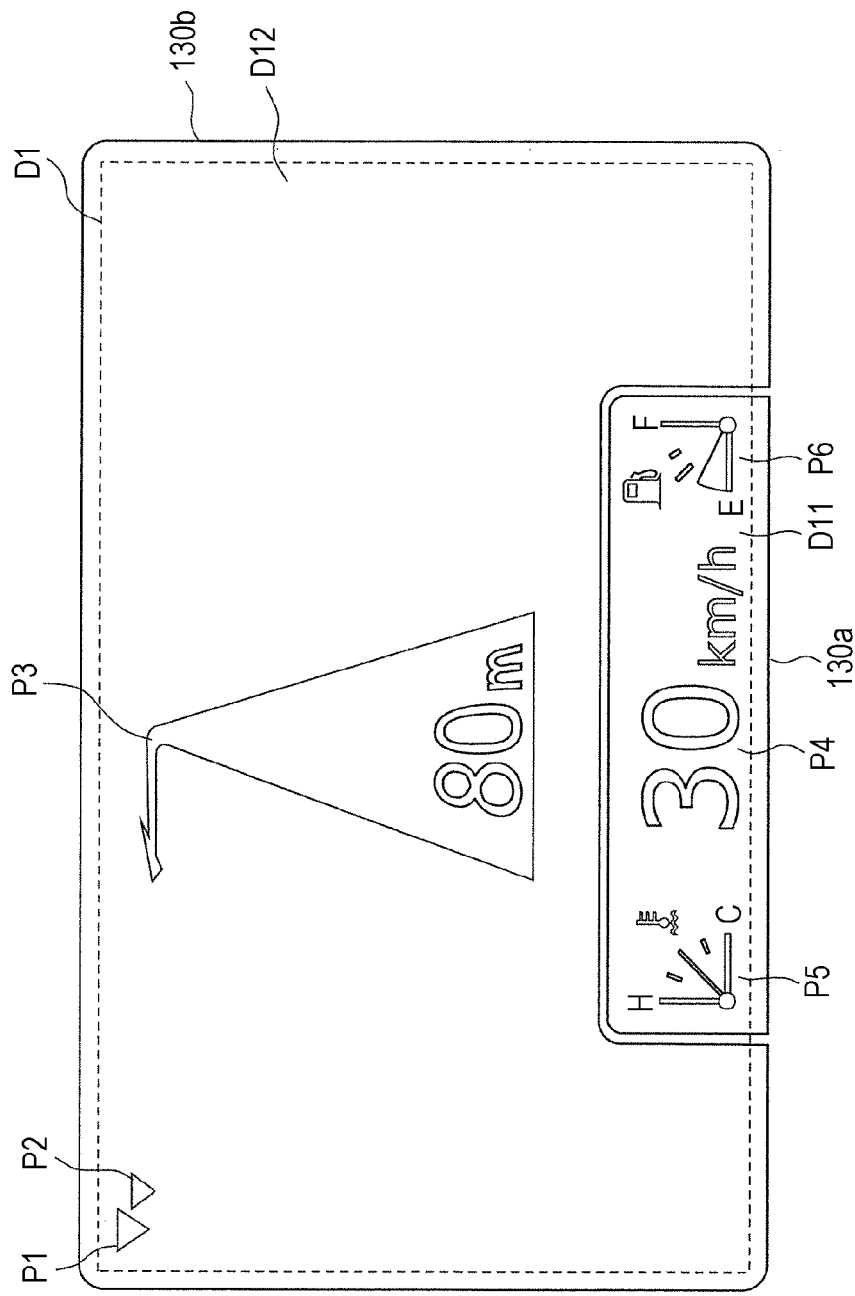
FIG. 8 is a view of relationships between a fixed screen according to the exemplary embodiment and one sub-region within a region on which pictures are to be projected and between a movable screen according to the exemplary embodiment and another sub-region.

FIG. 8 is a view of relationships between screen 130 according to this exemplary embodiment and sub-regions within region D1 on windshield 201 on which pictures are to be projected. In FIG. 8, pictures P1 to P6 illustrated in FIG. 3 as virtual images overlap screen 130 and region D1. Furthermore, FIG. 8 illustrates locations at which the pictures corresponding to the virtual images are formed in or projected onto screen 130 or region D1.

In FIG. 8, region D1 is divided into sub-regions D11 and D12. Sub-region D11 is a sub-region of region D1 which is related to fixed screen 130*a*. In FIG. 8, sub-region D11 is a portion of region D1 which overlaps fixed screen 130*a*. Sub-region D12 is a sub-region of region D1 which is related to movable screen 130*b*. In FIG. 8, sub-region D12 is a portion of region D1 which overlaps movable screen 130*b*. Thus, sub-region D11 and sub-region D12 are disposed side by side vertically in relation to the positional relationship between fixed screen 130*a* and movable screen 130*b*. The expression "disposed side by side vertically" indicates the positional relationship between entire sub-region D11 and entire sub-region D12, but this disposition also allows for an area in which sub-region D11 and sub-region D12 are partly (the lower edge in FIG. 8) disposed laterally, as illustrated in the figure. Sub-region D11 may be an example of a first region of display medium 200, and sub-region D12 may be an example of a second region of display medium 200.

As illustrated in FIG. 8, each of pictures projected onto windshield 201 by optical system 150 and displayed as pictures P4 to P6 is a picture (first picture) formed on fixed screen 130*a* of screen 130. This first picture is projected onto sub-region D11 on windshield 201 by optical system 150.

Likewise, each of pictures projected onto windshield 201 by optical system 150 and displayed as pictures P1 to P3 is a picture (second picture) formed on movable screen 130*b* of screen 130. This second picture is projected onto sub-region D12 on windshield 201 by optical system 150.

The first picture is projected onto sub-region D11 on windshield 201 through optical system 150 and displayed as a virtual image. The second picture is projected onto sub-region D12 on windshield 201 through optical system 150. As a result, sub-region D11 and sub-region D12 are disposed side by side vertically, as described above.

As described above, first picture and second picture are projected onto sub-regions D11 and D12, respectively, disposed within a predetermined display region (D1) in a predetermined direction and are displayed as virtual images. Since the positional relationship between the sub-regions is fixed, a virtual image with an invariable display distance which is formed from the first picture is displayed within a given area in the viewing field of the driver.

In the above way, display device 10 according to this exemplary embodiment enables a virtual image whose display distance is varied spatially with time and a virtual image whose display distance is not varied to coexist within a display region (D1). In addition, display device 10 can fix an area in which a virtual image with a fixed display distance can be viewed. Consequently, the driver can swiftly focus his/her eye on the virtual image with a fixed display distance and can promptly obtain information from this virtual image. This enables the driver to drive safely.

Display device 10 according to this exemplary embodiment displays a virtual image with a variable display distance and a virtual image with a fixed display distance by using different screens. Therefore, both virtual images do not interfere with each other. Consequently, display device 10 can continuously provide a display that is highly convenient to the driver by using a virtual image with a variable display distance.

FIGS. 3 and 8 also illustrate an example of information indicated by the first pictures and the second pictures. In these figures, since pictures that indicate information regarding a running speed, an amount of remaining fuel, and a temperature of cooling water, for example, do not need to overlap a scene surrounding the vehicle, these pictures are displayed as pictures with an invariable display distance (virtual images formed from the first pictures). In addition, information regarding a surrounding moving object, such as a pedestrian, and a location at which the vehicle running on the route will change its direction is displayed as virtual images with a variable display distance (virtual images formed from the second pictures). Furthermore, the virtual images formed from the first pictures are displayed within the sub-region D11 positioned in a lower portion of region D1 while overlapping the hood. The virtual images formed from the second pictures are displayed within the sub-region D12 positioned in an upper portion of region D2 while overlapping an actual scene. The above description is an example of a display provided by display device 10 when display device 10 is used as a vehicular HUD. This example is believed to be strategical in terms of convenience and safety. However, a layout of virtual images within each sub-region and information indicated by these virtual images are not limited to the layout and information, respectively, in this example. As an example, virtual images formed from the second pictures may indicate a road surface condition on the route, a traffic lane line, and a road shoulder. As another example, virtual images formed from the first pictures may indicate pictures that do not need to provide depth perception, such as pinpoint locations of a surrounding moving object such as a pedestrian, and an obstacle.

Figure 9:
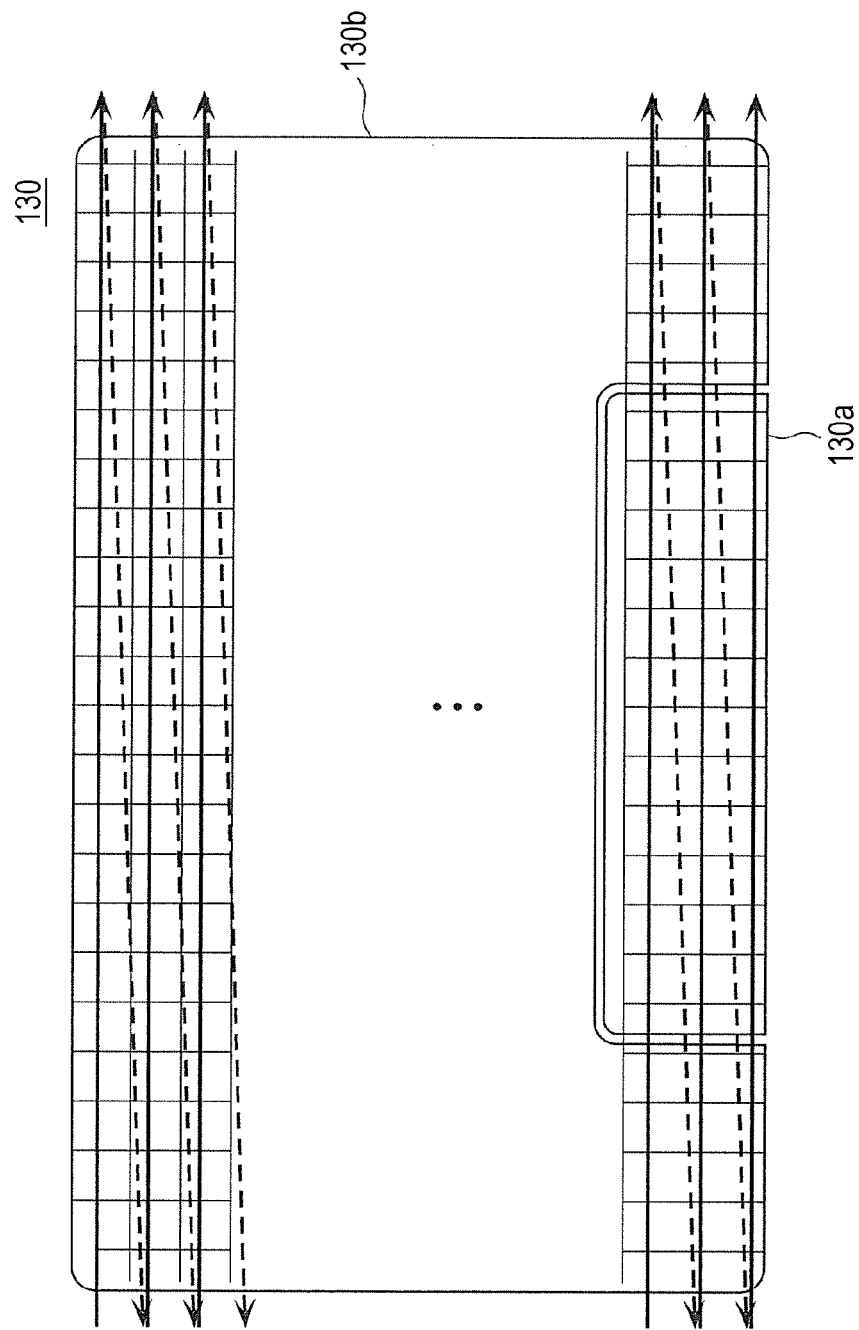
FIG. 9 is a view of an example of a method of scanning a screen according to the exemplary embodiment.

Next, a method of scanning screen 130 will be described in detail. FIG. 9 is a view of an example of a method according to this exemplary embodiment in which scanner 120 scans screen 130.

As illustrated in FIG. 9, scanner 120 scans screen 130 with a raster scanning system, for example. In this figure, solid line arrows each indicate a scan line and a scanning direction. First, scanner 120 performs the scanning from the upper left corner to the upper right corner in a one-dimensional manner. Then, scanner 120 shifts a scan line to be scanned, in a direction vertical to the direction of the one-dimensional scanning on screen 130, more specifically in a downward direction of FIG. 9 (indicated by a broken line arrow), and performs the next one-dimensional scanning. Scanners 120 repeats the above processes, thereby scanning entire screen 130 in a two-dimensional manner. As illustrated in FIG. 9, scanner 120 sequentially scans movable screen 130b and fixed screen 130a as a series of scanning processes. This method enables scanner 120 to scan entire screen 130 efficiently, because fixed screen 130a occupies an interior of the cut on the end of movable screen 130b, and fixed screen 130a and movable screen 130b are integrated with each other. In addition, this method enables scanner 120 to scan entire screen 130 with a single MEMS mirror.

The sequence in which scanner 120 performs the raster scanning is not limited to the above sequence. Alternatively, as the description with reference to FIG. 4, scanner 120 may raster-scan screen 130 upward.

MODIFICATIONS

Next, some modifications of the foregoing exemplary embodiment will be described with reference to the accompanying drawings.

For example, a configuration of a screen is not limited to the configuration in FIG. 7. Pictures to be displayed and their layout are not limited to the pictures and layout, respectively, in FIGS. 3 and 7. Hereinafter, some other examples will be given.

Figure 10A:
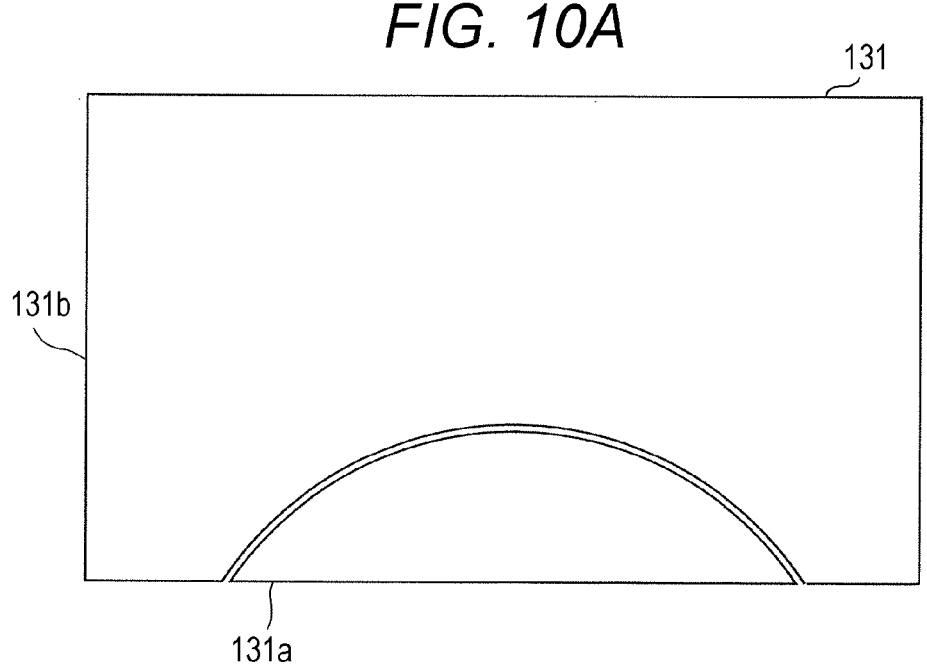
FIG. 10A is a view of another example of a configuration of a screen according to a modification of the exemplary embodiment.
Figure 10B:
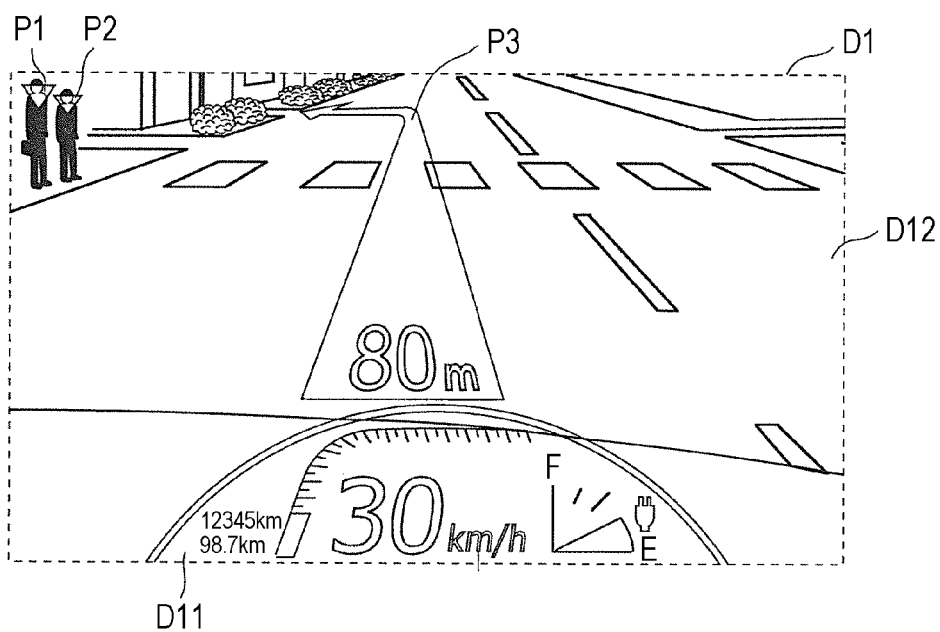
FIG. 10B is a view of an example of pictures displayed on the screen illustrated in FIG. 10A.

FIGS. 10A and 10B are views each illustrating another example of a configuration of a screen according to a modification, and pictures displayed on the screen.

FIG. 10A illustrates screen 131, which is another example of screen 130, and fixed screen 131a and movable screen 131b that constitute screen 131. Screen 131 differs from screen 130 in a shape of a cut of the end of movable 131b and a shape of fixed screen 131a that occupies the interior of the cut. Other features, such as a feature in which fixed screen 131a and movable screen 131b are integrated to form a substantially rectangular shape, are the same. Likewise, a feature in which a contour of fixed screen 131a contains only a portion of a lower side of this substantially rectangular shape as its portion is the same. More specifically, in any case, a movable screen spans from the upper edge to the lower edge of the substantially rectangular shape on both right and left ends. Configuring the screen in this manner makes it possible to dynamically and swiftly display a virtual image with its display distance varied, for example when any object enters a route of a vehicle from the right or left side or approaches the vehicle from the right or left rear, which is its blind spot. This can promptly encourage a driver to pay attention to the object.

FIG. 10B illustrates an example of a viewing field within region D1 which corresponds to screen 131. Similar to the example given in the exemplary embodiment, virtual images with an invariable display distance are displayed through sub-region D11, which corresponds to fixed screen 131a, while overlapping a hood. Virtual images with a variable display distance are displayed through sub-region D12, which corresponds to movable screen 131b, while overlapping a scene around the vehicle.

In this modification, a picture indicating a running distance is displayed instead of the picture indicating a temperature of cooling water. In addition, a picture indicating an amount of remaining power in a battery is displayed instead of the picture indicating an amount of remaining fuel. These are examples of information indicated by virtual images with an invariable display distance, as a display of a display device used for a vehicular HUD.

Figure 11A:
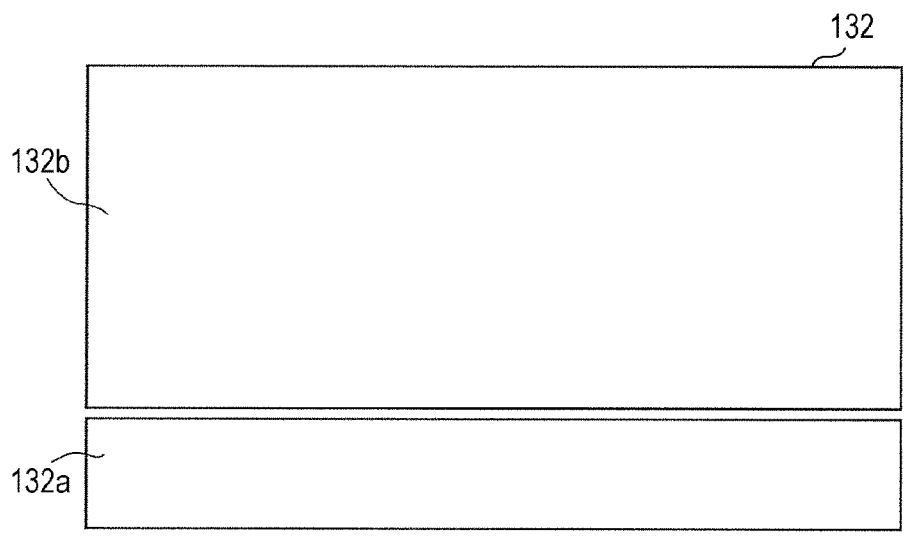
FIG. 11A is a view of still another example of a configuration of a screen according to a modification of the exemplary embodiment.
Figure 11B:
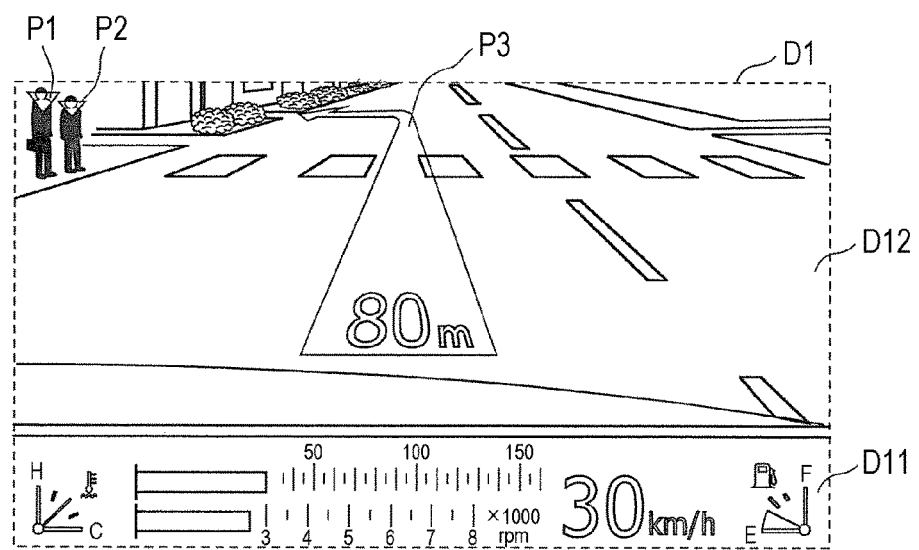
FIG. 11B is a view of an example of pictures displayed on the screen illustrated in FIG. 11A.

FIGS. 11A and 11B are views each illustrating still another example of a configuration of a screen according to a modification, and pictures displayed on the screen.

FIG. 11A illustrates screen 132, which is still another example of screen 130, and fixed screen 132a and movable screen 132b that constitute screen 132. Screen 132 differs from screen 130 in that fixed screen 132a does not have a cut on one end. However, the feature in which the fixed screen and the movable screen are integrated to form a substantially rectangular shape is the same. Thus, in this configuration, the fixed screen and the movable screen may be integrated to form a substantially rectangular shape, and the substantially rectangular shape may be simply split by a straight line. A contour of fixed screen 132a may contain the whole of one side of this substantially rectangular shape as its portion. In other words, the movable screen 132b does not have to span from the upper edge to the lower edge of the substantially rectangular shape on both right and left ends. In this example, as illustrated in FIG. 11B, a sub-region (D11) on which virtual images with an invariable display distance are displayed is set to be wider than any of the sub-regions according to the foregoing exemplary embodiment and its one modification. Setting the width of the sub-region in this manner can display many more virtual images through sub-region D11, thereby providing a driver with a larger number of pieces of information. In the example illustrated in FIG. 11B, gauges indicating a speed and a number of revolutions in an engine are added, in comparison with the example illustrated in FIG. 3. Even in this case, the virtual images are also displayed through D11 while overlapping a hood.

In the foregoing description, virtual images are displayed while overlapping a hood. Instead of the hood, however, virtual images may be displayed as appropriate while overlapping objects under a scene around or in front of the vehicle which a driver can view. For example, a case where a driver in a vehicle cannot view a hood is conceivable.

It should be noted that these modifications do not limit an aspect of a display provided by a display device according to the present invention.

For example, the movable screen and the fixed screen do not necessarily have to create a rectangular region. As an alternative example, this area may have a circular shape, an oval shape, a polygonal shape, or a geometrical shape formed with a free-form curve, or a combination of one or more of such circular, oval, polygonal, and geometrical shapes.

A positional relationship between regions in which virtual images with a fixed display distance are displayed and in which virtual images with a variable display distance are displayed is not limited to the foregoing positional relationship. The region in which virtual images with a variable display distance are displayed may be positioned under the region in which virtual images with a fixed display distance are displayed. Alternatively, both the areas may be laterally or diagonally positioned side by side. This layout may be changed as appropriate in accordance with an application of a display device of the present invention or its appearance. The above layout is an example in the case where a display device of the present invention is used as a vehicular HUD.

Information indicated by virtual images in the case where a display device of the present invention is used as a vehicular HUD is not limited to the above information. As an alternative example, in addition to a location at which a vehicle running on a route will change its direction, virtual images with a variable display distance may indicate a facility and a geographical name on a route, an entire route, traffic information regarding a route, such as congestion and a traffic regulation, a condition of a road surface, a traffic lane line, and a road shoulder.

In the foregoing exemplary embodiment, the constituent elements may be implemented in dedicated hardware or with execution of software programs individually suitable for those constituent elements. The constituent elements may be implemented by a program execution section, such as a CPU or a processor, reading and executing software programs stored in a recording medium, such as a hard disk or a semiconductor memory.

The display device according to one or more aspects has been described above based on the exemplary embodiment. However, the present invention is not limited to this exemplary embodiment. Configurations in which various variations conceived by those skilled in the art are applied to the present exemplary embodiment, and configurations established by combining constituent elements in different exemplary embodiments may also fall within the scope of one or more aspects, without departing from the gist of the present invention.

As described above, a display device according to an aspect of the present invention displays virtual images of a first picture and a second picture by using a display medium. This display device includes a light source that emits light, a fixed screen, a movable screen, a driver, and a scanner. The fixed screen is fixedly disposed on an optical path between the light source and the display medium. The movable screen is also disposed on this optical path. The driver moves the movable screen along the optical path. The scanner scans the fixed screen and the movable screen with the light emitted from the light source, thereby forming the first picture on the fixed screen and the second picture on the movable screen.

With the above configuration, virtual images with a fixed display distance and with a variable display distance are displayed at the same time. The display distances of the virtual images with a fixed display distance and with a variable display distance depend on locations of different screens, and thus both virtual images do not interfere with each other. As a result, a virtual image with a fixed display distance continuously indicates information at a constant distance; therefore, a user can swiftly focus his/her eye on and obtain the information. As described above, a display device according to an aspect of the present invention displays an image that a user can view easily.

For example, this display device may further include an optical system disposed on the optical path between the display medium and both the fixed screen and the movable screen. In this case, the first picture is projected onto a first region of the display medium through the optical system and displayed as a virtual image. The second picture is projected onto a second region of the display medium through the optical system and displayed as a virtual image. The first region and the second region are disposed side by side in a predetermined direction. For example, the predetermined direction may be a vertical or horizontal direction.

If the predetermined direction is a vertical direction, for example, regions in which a virtual image with a variable display distance is displayed and in which a virtual image with a fixed display distance is displayed are disposed side by side vertically. As a result, the user can view the virtual image with a variable display distance when looking at an upper (or lower) portion of an entire display area of virtual images, and in turn, can view the virtual image with a fixed display distance when looking at a lower (or upper) portion. In this way, the user can swiftly focus his/her eye on the virtual images disposed in the predetermined direction within a display area. As described above, a display device according to an aspect of the present invention displays an image that a user can view easily.

For example, the movable screen may have a cut on its end, and at least a portion of the fixed screen may be disposed in this cut. As a concrete example of this layout, the fixed screen and the movable screen may be integrated to form a substantially rectangular shape as viewed on the optical path from a location of the scanner. A contour of the fixed screen may contain at least a portion of a side of this substantially rectangular shape.

As a concrete example, virtual images with a fixed display distance and with a variable display distance may be displayed within a substantially rectangular region. The virtual image with a variable display distance may be displayed within a sub-region in the substantially rectangular region which corresponds to the substantially rectangular area from which a portion of its end is removed. The virtual image with a fixed display distance is displayed within a sub-region that corresponds to this removed portion. In this case, when a user views a virtual image with a fixed display distance, this virtual image is present within the sub-region in the entire display area which is positioned in the predetermined direction. Therefore, the user can continuously and swiftly focus his/her eye on the virtual image within the sub-region. As described above, a display device according to an aspect of the present invention displays an image that a user can view easily.

For example, the scanner may sequentially scan the movable screen and the fixed screen as a series of scanning processes. This configuration enables the scanner to effectively scan the entire screen by using a single reflective body, such as a MEMS mirror.

For example, the display medium may be a windshield of a vehicle. In this case, a driver of this vehicle, who is a user of a display device, can view the virtual images with a fixed display distance and with a variable display distance on the opposite side of the windshield, or outside the vehicle, with respect to a driver's seat. The driver can swiftly shift the focus of the eye from the virtual image with a variable display distance to the virtual image with a fixed display distance, during the driving. Consequently, the driver can promptly obtain information indicated by a virtual image with a fixed display distance but nevertheless is less likely to overlook other information. As described above, a display device according to an aspect of the present invention displays an image that a user can view easily.

If the display medium is the windshield of the vehicle, for example, the first picture may be a picture that indicates information regarding at least one of a running speed, an amount of remaining fuel, and an amount of remaining power in a battery in the vehicle, and a moving object around the vehicle. The second picture may be a picture that indicates information regarding at least one of an entire route to a destination, a portion of the route, a traffic condition of the route, a condition of a road surface, a traffic lane line or a road shoulder, and a moving object around the vehicle.

With the above configuration, the driver can promptly obtain, at a desired timing, information regarding a running speed, an amount of remaining fuel, and an amount of remaining power in a battery in the vehicle, for example, from the virtual images with a fixed display distance. As a result, the driver is less likely to overlook information to be visually obtained from a source other than virtual images with a fixed display distance. Examples of a source for such information include a virtual image with a variable display distance, various road signs around the vehicle, a guidance sign of a facility, and a signal from a surrounding moving object.

It should be noted that those comprehensive or specific aspects may be implemented by a system, a method, an integrated circuit, a computer program, or a computer-readable recording medium such as a CD-ROM, or may be implemented by any combination of the system, the method, the integrated circuit, the computer program, and the recording medium.

INDUSTRIAL APPLICABILITY

The present invention is applicable to display devices that display virtual images by using a display medium. For example, the present invention is applicable to vehicular HUDs that display virtual images by using a windshield as a display medium.

REFERENCE MARKS IN THE DRAWINGS

10: display device
100: controller
110: light source
120: scanner
130, 131, 132: screen
130*a*, 131*a*, 132*a*: fixed screen
130*b*, 131*b*, 132*b*: movable screen
140: driver
150: optical system
200: display medium
201: windshield
202: hood
300: vehicle
301: dashboard

The invention claimed is:
1. A display device that displays a virtual image of a first picture and a virtual image of a second picture by using a display medium, the display device comprising:
 a light source that emits light;
 a fixed screen fixedly disposed on an optical path between the light source and the display medium;
 a movable screen disposed on the optical path;
 a driver that translates the movable screen along the optical path; and
 a scanner that scans the fixed screen and the movable screen with the light emitted from the light source to form the first picture on the fixed screen and the second picture on the movable screen,
 wherein the scanner sequentially scans the movable screen and the fixed screen as a series of scanning processes, wherein the driver linearly translates the movable screen along the optical path, and wherein the movable screen is a physical structure.

2. The display device according to claim 1, wherein the movable screen has a cut formed on an end of the movable screen, and at least a portion of the fixed screen is disposed in the cut.

3. The display device according to claim 1, wherein the fixed screen and the movable screen are integrated to form a substantially rectangular shape as viewed on the optical path from a location of the scanner, and a contour of the fixed screen contains at least a portion of one side of the substantially rectangular shape.

4. The display device according to claim 1, wherein the driver is an actuator.

5. The display device according to claim 1, wherein a display distance of the virtual image corresponding to the moving screen is configured to be variable by a translation of the moving screen.

6. The display device according to claim 1, wherein the movable screen translates along a portion of the optical path provided by the scanner.

7. The display device according to claim 1, further comprising an optical system disposed between the display medium, and the fixed and movable screens, on the optical path, wherein the first picture is projected onto a first region in the display medium through the optical system and displayed as the virtual image of the first picture, the second picture is projected onto a second region in the display medium through the optical system and displayed as the virtual image of the second picture, and the first region and the second region are disposed side by side in a predetermined direction.

8. The display device according to claim 7, wherein the predetermined direction is a vertical or horizontal direction.

9. The display device according to claim 1, wherein the display medium is a windshield of a vehicle.

10. The display device according to claim 9, wherein the first picture is a picture that indicates information regarding at least one of a running speed, an amount of remaining fuel, and an amount of remaining power in a battery in the vehicle, and a moving object around the vehicle, and the second picture is a picture that indicates information regarding at least one of an entire route to a destination, a portion of the route, a traffic condition of the route, a condition of a road surface, a traffic lane line or a road shoulder, and a moving object around the vehicle.

* * * * *